United States Patent
Nishina

(10) Patent No.: US 6,836,712 B2
(45) Date of Patent: Dec. 28, 2004

(54) DATA RECORDING SYSTEM

(75) Inventor: Masatoshi Nishina, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 76 days.

(21) Appl. No.: 10/212,705

(22) Filed: Aug. 7, 2002

(65) Prior Publication Data

US 2003/0033062 A1 Feb. 13, 2003

(30) Foreign Application Priority Data

Aug. 10, 2001 (JP) ........................................ 2001-243807

(51) Int. Cl.$^7$ ........................ G01M 17/00; G06F 19/00
(52) U.S. Cl. ........................ 701/35; 701/29; 340/438
(58) Field of Search ........................ 701/29, 34, 35, 701/63; 340/438, 439

(56) References Cited

U.S. PATENT DOCUMENTS

| | | | | |
|---|---|---|---|---|
| 5,465,613 A | * | 11/1995 | Takaba et al. | 73/117.3 |
| 5,506,773 A | * | 4/1996 | Takaba et al. | 701/29 |
| 5,964,813 A | * | 10/1999 | Ishii et al. | 701/35 |
| 6,115,653 A | * | 9/2000 | Bergstrom et al. | 701/29 |
| 6,115,656 A | * | 9/2000 | Sudolsky | 701/35 |
| 6,122,575 A | * | 9/2000 | Schmidt et al. | 701/29 |
| 6,256,594 B1 | * | 7/2001 | Yamamoto et al. | 702/185 |
| 6,295,488 B1 | * | 9/2001 | Longere | 701/29 |
| 6,483,938 B1 | * | 11/2002 | Hennessey et al. | 382/149 |
| 6,604,032 B1 | * | 8/2003 | Moller | 701/29 |
| 2002/0055807 A1 | * | 5/2002 | Zimmermann et al. | 701/1 |

FOREIGN PATENT DOCUMENTS

JP 6-18293 1/1994

* cited by examiner

*Primary Examiner*—Gary Chin
(74) *Attorney, Agent, or Firm*—Arent Fox, PLLC

(57) ABSTRACT

Abnormality detection is conducted with respect to data indicative of operating state of an apparatus, the abnormality type is then discriminated and a check is made as to whether the data are already recorded in association with the discriminated abnormality type in a memory region corresponding to the data, and if not, the data are recorded in association with the discriminated abnormality type there. Since, multiple recording of similar data related to transient abnormalities and other such events that are likely to occur repeatedly can be prevented, important data related to a diversity of abnormalities and failures can be efficiently recorded in the memory. Viewed from another angle, this means that the capacity of the memory can be reduced and that a cost-reducing effect can be anticipated. In addition, data important for troubleshooting abnormalities and failures, most notably transition period data, can therefore be efficiently recorded in the memory.

6 Claims, 8 Drawing Sheets

FIG. 7

| ADDRESS | I GROUP |
|---|---|
| 00H | ABNORMALITY TYPE (FAILURE CODE) |
| 01H | SHIFT SCHEDULING MAP |
| 02H | DISTANCE TRAVELLED |
| 03H | COOLANT TEMPERATURE TW |
| 04H | ⋮ |
| 05H | ⋮ |
| 06H | ⋮ |
| 07H | ⋮ |
| 08H | ⋮ |
| 09H | ⋮ |
| 0AH | ⋮ |
| 0BH | ⋮ |
| 0CH | ⋮ |
| 0DH | ⋮ |
| 0EH | ⋮ |
| 0FH | ⋮ |

| ADDRESS | II GROUP |
|---|---|
| *0H | DATA SAMPLING INTERVAL |
| *1H | OUTPUT SHAFT ROTATIONAL SPEED NC |
| *2H | INPUT SHAFT ROTATIONAL SPEED NM |
| *3H | THROTTLE OPENING TH |
| *4H | ENGINE SPEED NE |
| *5H | POSITION SIGNAL 1 |
| *6H | POSITION SIGNAL 2 |
| *7H | SUPPLY VOLTAGE TO SL1~SL8 |
| *8H | GEAR RATIO |
| *9H | TORQUE CONVERTER SLIP RATIO ETR |
| *AH | OUTPUT SIGNAL TO SL1~SL8 |
| *BH | SWITCH INPUT/OUTPUT SIGNAL |
| *CH | ⋮ |
| *DH | ⋮ |
| *EH | ⋮ |
| *FH | ⋮ |

DATA RECORDING SYSTEM

BACKGROUND OF THE INVENTION

1. Field of the Invention

This invention relates to a data recording system, particularly to a data recording system for recording data indicative of the operating state of an apparatus such a vehicle.

2. Description of the Related Art

Japanese Laid-open Patent Application No. Hei 6(1994)-18293, for example, teaches a technology related to such a data recording system. When the data recording system set out in this publication transfers measured data temporarily stored in a ring buffer to a prescribed recording region where it is stored, it ordinarily simultaneously thins the data at prescribed time interval. When the measured data falls outside a prescribed range, the data recording system generates a trigger and the stored data are transferred to and recorded at the prescribed recording region without thinning before and after trigger generation.

When the data recorded by such a data recording system are used to analyze the cause of an apparatus or equipment abnormality, the occurrence of an abnormality in the subject apparatus can defined as the condition for trigger generation.

Preferably, the data recording system should be capable of recording data related to apparatus abnormalities and failures in prescribed recording regions separately by type. That said, it must be noted, however, that apparatus abnormalities are of two types, transient and continuous. Transient abnormalities are ones likely to disappear of their own accord over the course of time, e.g., ones caused by noise and appearing only temporarily and ones appearing transiently under special operating states such as during extremely high-load operation. In other words, transient abnormalities are ones likely to shift repeatedly between normal and abnormal states (ones having high repeatability). These are called "abnormalities" in this specification. Continuous abnormalities are persistent ones unlikely to disappear of their own accord and low in repeatability. These are called "failures" in this specification. Transient abnormalities generally reappear a number of times. Therefore, if the occurrence of an abnormality is defined as the condition for generating a trigger, data on the same kind of abnormality will be recorded multiple times. As this wastes recording region capacity, it may become impossible to record important data on other abnormalities and failures.

One conceivable way of overcoming this problem would be to carefully discriminate whether an abnormality is a transient abnormality or a failure and when it is determined to be a failure to generate the aforesaid trigger and record data. With this configuration, however, it would be impossible to record data on transient abnormalities.

In troubleshooting apparatus abnormalities and failures, data for a prescribed period before the occurrence of the abnormalities (including ones which may later be determined to be failures), particularly data including information on the period of transition from the normal state to the abnormality (failure) state, are generally more important than data acquired before the occurrence of the abnormality or failure. Still, a certain amount of time is ordinarily required to determine that an apparatus abnormality is a failure. An inconvenience has therefore existed in that after an apparatus abnormality was determined to be a failure, data for a prescribed period prior to the abnormality (failure) needed to analyze (troubleshoot) the cause of the abnormality (failure) could no longer be obtained.

This inconvenience can be eliminated by continuously recording data over a period extending from a prescribed time point prior to abnormality (failure) occurrence to the time that the abnormality is determined to be a failure. However, since this results in also recording data that arise after the occurrence of the abnormality or failure and are not particularly essential for troubleshooting, i.e., data for the period during which the abnormality is determined to be a failure, it does not solve the problem of wasted recording region capacity.

Moreover, in view of the importance of the transition period data, recording of low repeatability data (i.e., of transition periods whose type is not likely to recur) associated with failures should be given priority to recording of high repeatability data (i.e., of transition periods whose type is likely to recur) associated with transient abnormalities.

SUMMARY OF THE INVENTION

An object of the present invention is therefore to provide a data recording system that overcomes the foregoing problems and enables important data related to a diversity of abnormalities and failures to be efficiently recorded in a prescribed recording region.

In a first aspect, the present invention achieves the foregoing object by providing a system for recording data indicative of operating condition of an apparatus, comprising; abnormality detecting means for detecting abnormality in the data; abnormality type discriminating means for discriminating a type of the abnormality when the abnormality is detected; record checking means for checking whether the data has been recorded in a prescribed recording region in association with the discriminated type of the abnormality; and data recording means for recording the data in the prescribed recording region in association with the discriminated type of the abnormality, when the data has not been recorded in the prescribed recording region in association with the discriminated type of the abnormality.

In a second aspect, the present invention achieves the foregoing object by providing a system for recording data indicative of operating condition of an apparatus, comprising; abnormality detecting means for detecting abnormality in the data; data recording means for recording the data in a prescribed recording region successively when the abnormality is detected; apparatus failure determining means for determining the abnormality as a failure of the apparatus based on a prescribed condition, when the abnormality is detected; and data erasing means for erasing the data when it is determined at a prescribed time point that the abnormality has not been determined as the failure of the apparatus.

BRIEF DESCRIPTION OF THE DRAWINGS

FIG. 7 is a table showing data recorded by the system of FIG. 1; and

DETAILED DESCRIPTION OF THE PREFERRED EMBODIMENT

A data recording system according to an embodiment of the present invention will now be explained with reference to the drawings.

Figure 1:
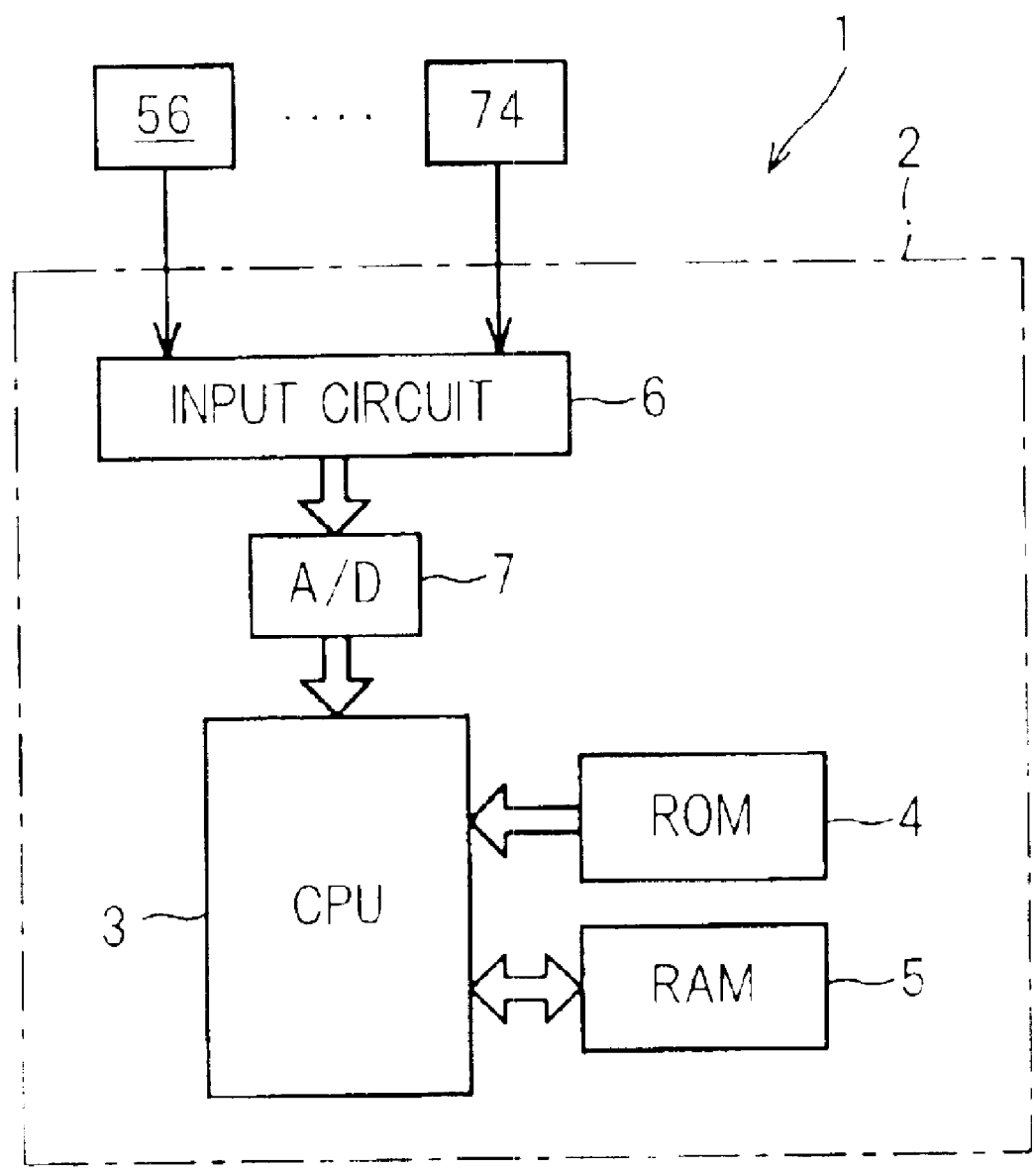
FIG. 1 is a block diagram showing a data recording system according to an embodiment of the present invention.

FIG. 1 is a block diagram showing the configuration of the data recording system according to the embodiment.

The data recording system, designated by reference numeral 1, is used to record data indicative of the operating state of an apparatus and analyze operating state abnormality and/or failure based on the recorded data. It is constituted as an ECU (Electronic Control Unit) 2. The ECU 2 is a microcomputer comprising a CPU 3, ROM 4, RAM 5, input circuit 6, and A/D converter 7.

The ECU 2, which is mounted at an appropriate location in a vehicle (not shown), controls the operations of an internal combustion engine, automatic transmission and/or other apparatuses all mounted on the vehicle to be controlled, and records data related to the controlled apparatus(es). In the following, an example will be explained in which the ECU 2 is constituted as a control system for the automatic transmission and is used to analyze abnormalities and failures of apparatuses, i.e., the automatic transmission, sensors and the like.

Figure 2:
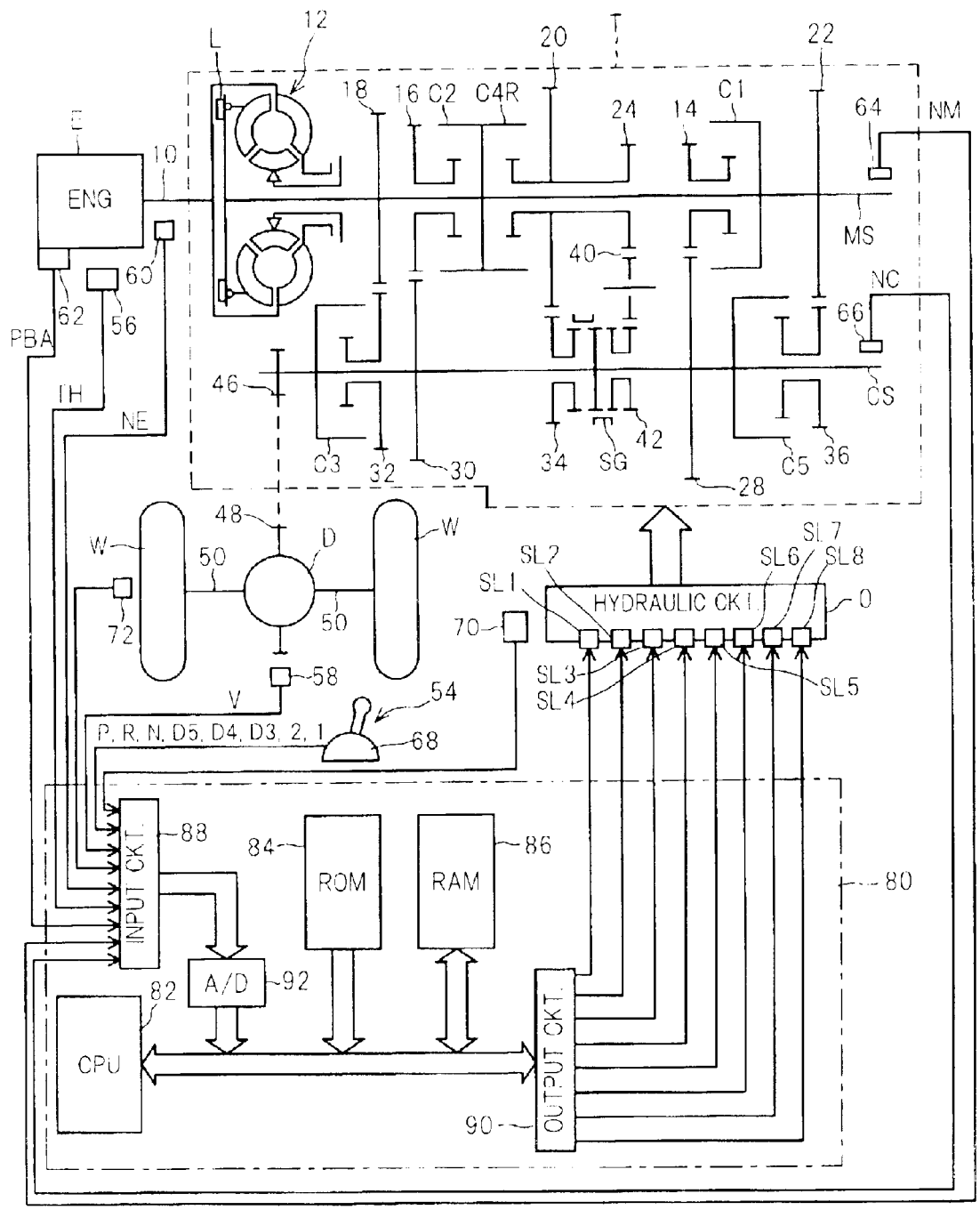
FIG. 2 is a schematic diagram showing an automatic transmission whose data are recorded by the system of Figure.

The control system of the automatic transmission will be explained with reference to FIG. 2.

Reference symbol T in FIG. 1 designates an automatic vehicle transmission (hereinafter referred to simply as the transmission T) installed in the vehicle. It is a parallel-shaft, multi-step automatic transmission having five forward speeds and one reverse speed.

The transmission T is equipped with a main shaft (input shaft) MS connected to a crankshaft 10 of an internal combustion engine E through a torque converter 12 having a lockup mechanism L and with a countershaft (output shaft) CS connected to the main shaft MS through multiple gear trains.

The main shaft MS supports main gears 14, 16, 18, 20, 22 and 24 associated with the first to fifth speed and reverse. The countershaft CS supports counter gears 28, 30, 32, 34 and 36 engaged with the first- to fifth-speed gears and a counter reverse gear 42 engaged with the main reverse gear 24 through a reverse idle gear 40.

A desired gear speed is established by operating hydraulic clutches C1, C2, C3, C4R and C5 for the respective gear speeds to appropriately connect the main shaft MS and the countershaft CS through the main gears and counter gears.

The rotation of the countershaft CS is transmitted through a final drive gear 46 and a final drive gear 48 to a differential D, from where it is transmitted to drive wheels W, W through left and right drive shafts 50, 50 of the vehicle.

A shift lever 54 is installed on the vehicle floor near the driver's seat to be used by the driver for selecting one from among eight positions (ranges) including P, R, N, D5, D4, D3, 2 and 1. An overdrive switch (not shown) and a running mode switch (for switching the vehicle running mode between a normal mode and a power mode; not shown) are provided near the shift lever 54.

A throttle position sensor 56 is provided near a throttle valve (not shown) located in the air intake pipe (not shown) of the engine E. The throttle position sensor 56 outputs a signal indicative of the degree of opening TH of the throttle valve. A vehicle speed sensor 58 provided near the final drive gear 48 outputs a signal indicative of the vehicle speed V.

A crank angle sensor 60 is provided near a camshaft (not shown) and outputs a signal indicative of the engine speed NE. A manifold absolute pressure sensor 62 is provided in the air intake path of the engine E downstream of the throttle valve and outputs a signal indicative of the absolute pressure PBA in the air intake pipe (indicative of the engine load).

A first rotational speed sensor 64 is provided near the main shaft MS and outputs a signal indicative of the input shaft rotational speed NM corresponding to the rotation of the main shaft MS. A second rotational speed sensor 66 is provided near the countershaft CS and outputs a signal indicative of the output shaft rotational speed NC corresponding to the rotation of the countershaft CS.

A shift lever position sensor 68 is provided near the shift lever 54 and outputs a signal indicative of the position selected by the driver. The overdrive switch and the running mode switch provided near the shift lever 54 output ON and OFF signals.

A temperature sensor 70 is provided on or at an appropriate location near the transmission T and outputs a signal proportional to the fluid temperature (Automatic Transmission Fluid temperature; operating fluid temperature) TATF. A brake switch 72 is provided near a brake pedal (not shown) installed on the floor of the vehicle near the driver's seat and outputs an ON signal when the driver depresses the brake pedal. A coolant temperature sensor 74 is provided near the engine E and outputs a signal proportional to the coolant temperature TW.

The outputs of the sensor 56 and other sensors are sent to the ECU 2. Based on the input signals, the CPU 3 of the ECU 2 selects a map from among a plurality of maps defining shift schedules for hill climbing, hill descent and the like. The CPU 3 retrieves a gear ratio from the selected map using the vehicle speed V and throttle opening TH as address data. Then, operating through an output circuit 90 and power supply circuit (not shown), it energizes/deenergizes solenoids (electromagnetic solenoids) SL1 to SL5 installed in a hydraulic circuit O so as to control switching of hydraulic clutches. It also energizes/deenergizes similar linear solenoids SL6 to SL8 to control the operation of the lockup mechanism L of the torque converter 12 and the clutch hydraulic pressure. (The particulars of this control are not directly related to the gist of this invention and will not be explained in detail.)

As shown in FIG. 1, the sensor group comprised of the sensor 56 etc. is connected to the input circuit 6. The outputs of the sensor 56 etc. input through the input circuit 6 of the ECU 2 are converted into digital values when they are analog values.

The CPU 3, operating in accordance with a control program loaded in the ROM 4 in advance, samples the various input signal values and internally calculated values, e.g., the gear ratio etc., at a prescribed period and continually writes the sampled input signal values and calculated values (hereinafter collectively referred to as "data") in the RAM 5 to store the same as updated time series data indicative of the operating state of the transmission T while simultaneously thinning the data at a prescribed (or variable) time interval.

It should be noted here that "to store data" indicates in this specification to memorize the data temporarily such that the data may be updated. The particulars of the operations for storing data in the RAM 5 are not directly related to the gist of this invention and will not be explained in detail.

When the CPU 3 detects an abnormality in the data, it inhibits the continual updating of the data stored in the RAM 5 to fix the stored data, except in case of a special condition being present. This ensures that time series data that arose before the data abnormality was detected are kept recorded and stored in the RAM 5. It should also be noted here that "to record data" indicates to store the data such that the data may be erased, but will never be updated.

Figure 3:
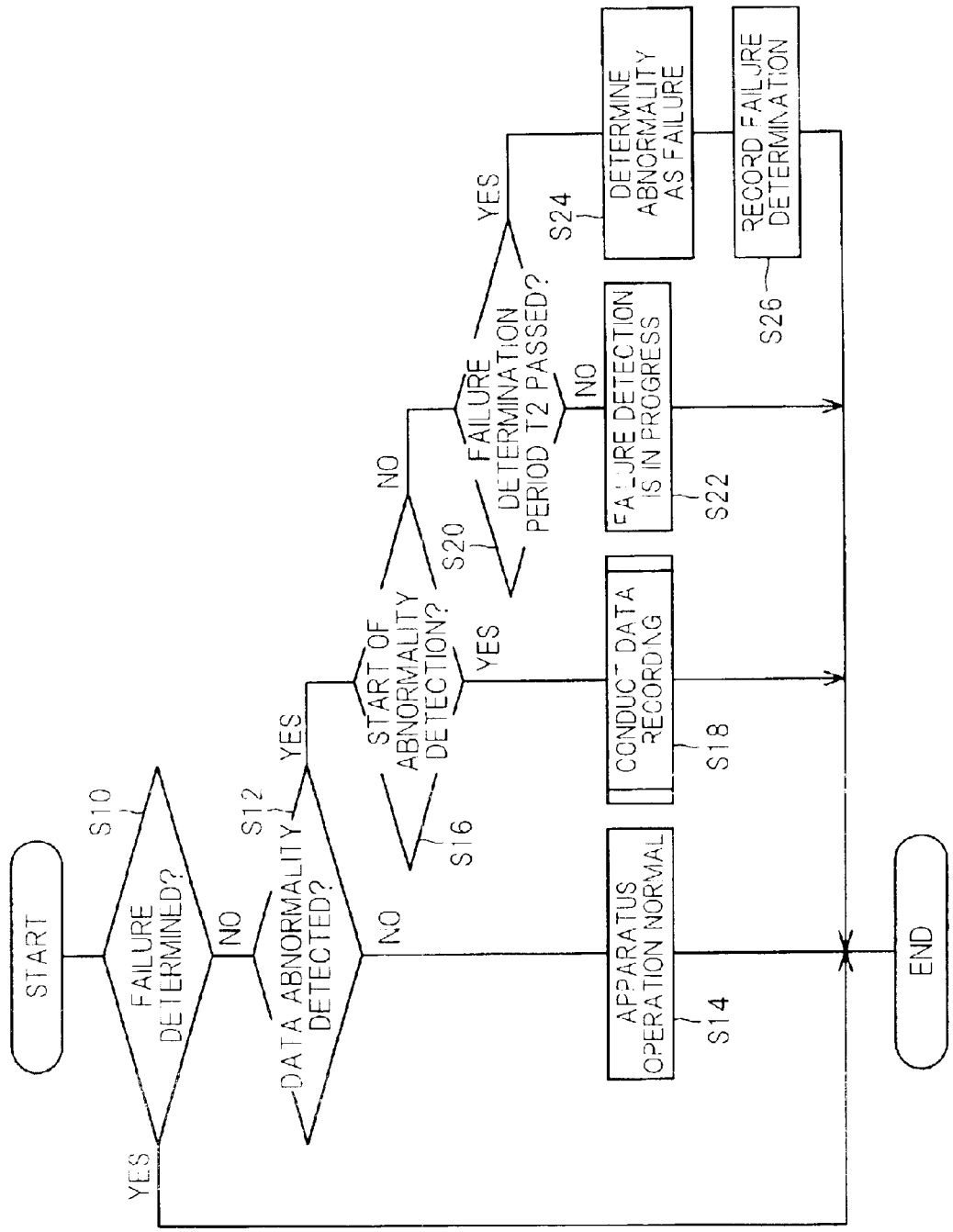
FIG. 3 is a flow chart showing the operation of the system of FIG. 1 for recording data and determining failure.

The operations of the data recording system 1 for recording data in the RAM 5 and determining whether a detected abnormality is a failure will now be explained with reference to the flow chart of FIG. 3. The program shown in FIG. 3 is activated once every 10 msec, for example.

First, in S10, it is checked whether occurrence of a failure has already been determined. By an "already determined failure" is meant a failure determined in an earlier cycle (program loop) when, in the steps explained in the following, a detected abnormality was determined to be a failure based on a prescribed condition. When the result in S10 is YES, i.e., when a failure has already been determined, the remaining steps of the program are skipped. When the result is NO, the program proceeds to S12, in which it is checked whether a data abnormality has been detected.

Figure 4:
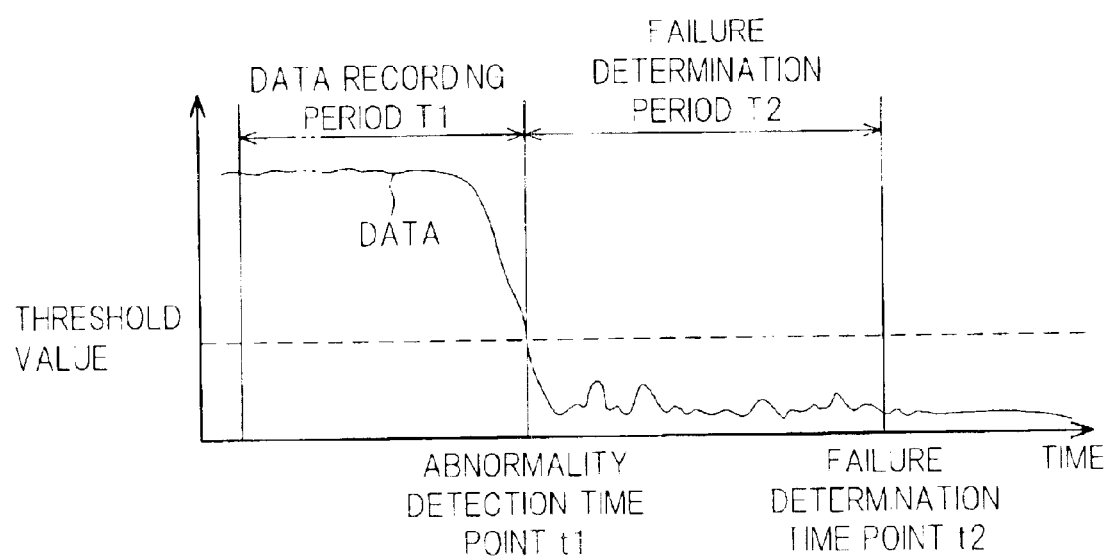
FIG. 4 is a time chart explaining the operation of the flow chart of FIG. 3.

Specifically, with regard to a sensor output among the various data, a threshold value such as shown in the time chart of FIG. 4 is established beforehand as an abnormality index, and occurrence of an abnormality is discriminated by comparing the value of the sensor output sampled in the current cycle (program loop) with the threshold value. Occurrence of an abnormality in the output of the shift lever position sensor 68 is discriminated by checking whether two or more signals indicating shift lever position are being simultaneously outputted. Abnormalities in the gear ratio, solenoid output and other values internally calculated in the CPU 3 are discriminated by comparing the manipulated variable and the controlled variable.

When the result in S12 is NO, i.e., when it is found that no data abnormality has been detected, the program proceeds to S14, in which it is determined that operation of the apparatus is normal and the program is terminated. When the result YES, i.e., when it is found that a data abnormality has been detected, the program proceeds to S16, in which it is checked whether this is the start of abnormality detection. Specifically, it is checked whether this is the first cycle (program loop) in which the abnormality was detected, i.e., whether the time point of executing S16 is the abnormality detection time point t1 in FIG. 4.

When the result in S16 is YES, i.e., when it is found that this is the start of abnormality detection, the program proceeds to S18, in which data recording is conducted.

Figure 5:
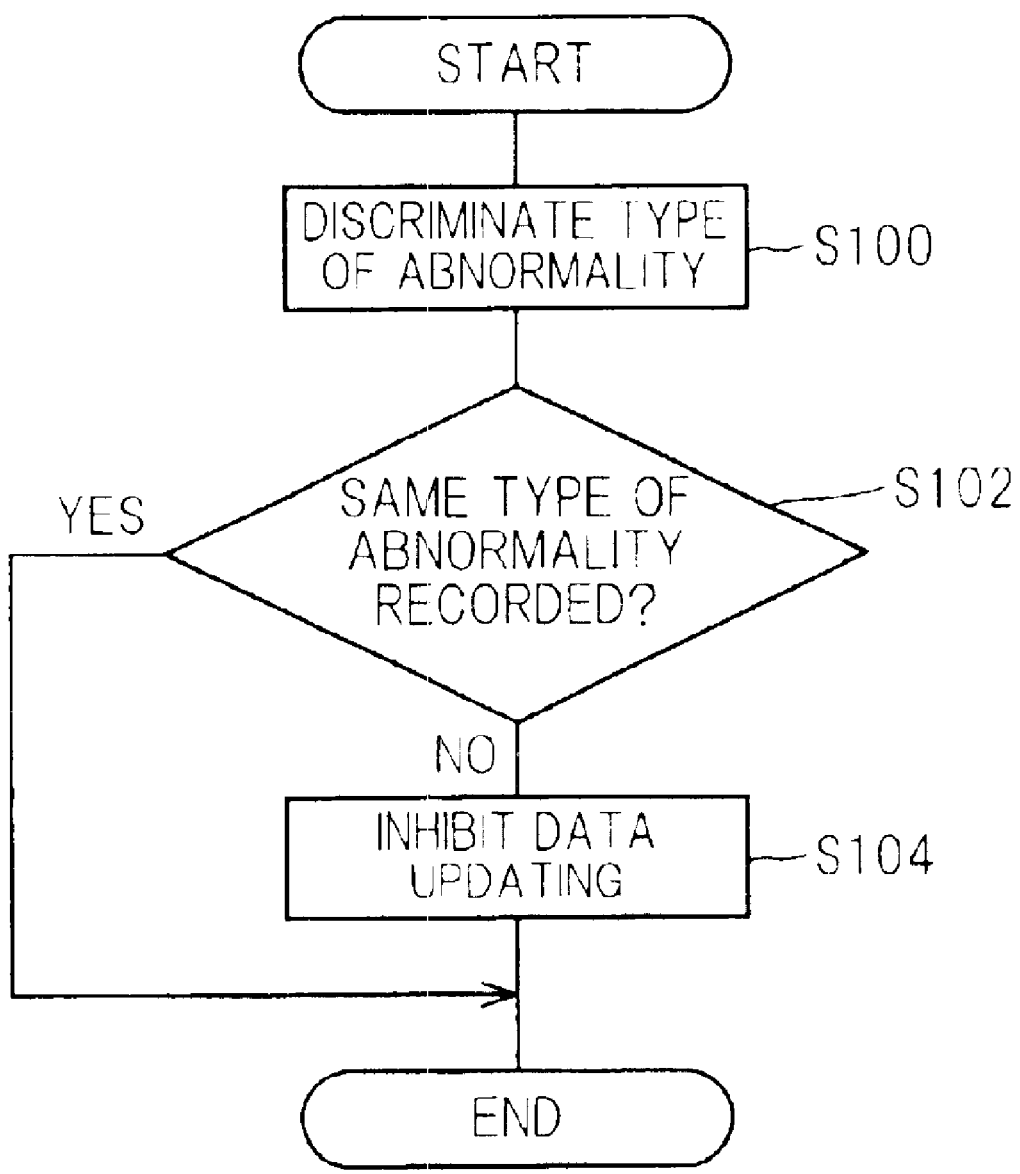
FIG. 5 is a subroutine flow chart showing data recording referred to in the flow chart of FIG. 3.

FIG. 5 is a subroutine flow chart showing the specifics of the data recording procedure. First, in S100, the type of the abnormality detected in S12 of the flow chart of FIG. 3 is discriminated. For example, it is discriminated whether the detected abnormality is an abnormality in the position signal from the shift lever position sensor 68, an abnormality in the signal indicative of the coolant temperature TW from the coolant temperature sensor 74, and so forth. At the same time, the exact nature of the abnormality (e.g., output of the coolant temperature sensor 74 too high (or too low)) is also discriminated.

Next, in S102, it is checked whether data on the same type of abnormality as that discriminated in S100 are already recorded and stored in the RAM 5. When the result is NO, i.e., when it is found that no data on a similar abnormality has yet been recorded, the program proceeds to S104, in which updating of the data in the RAM 5 is inhibited, thereby ensuring that time series data for a prescribed time period (data recording period T1; e.g., 6 seconds) before the time point of abnormality detection, i.e., before the abnormality detection time point t1 shown in FIG. 4, are kept recorded and stored.

Figure 6:
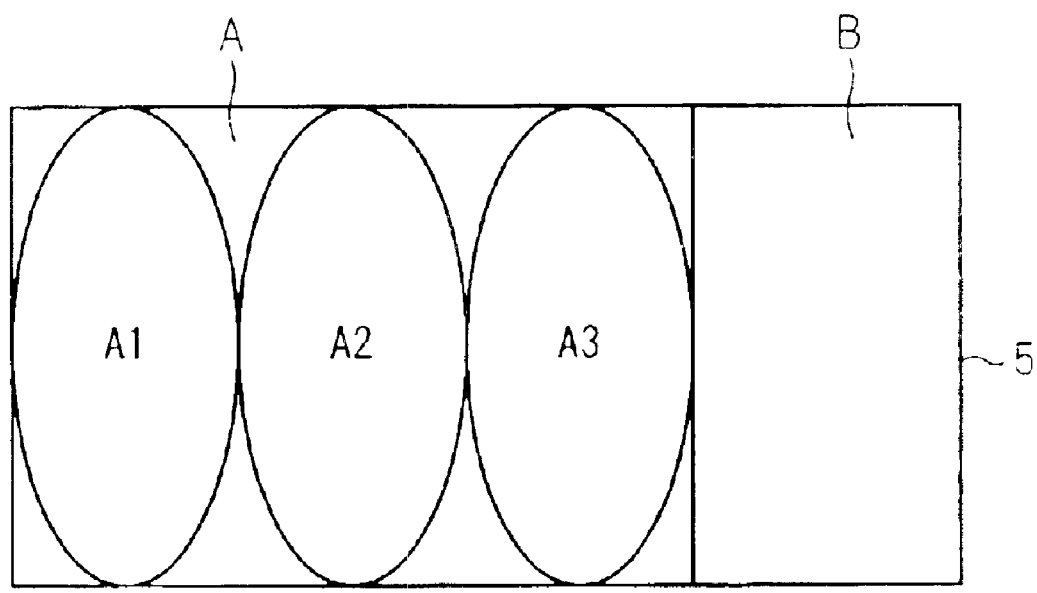
FIG. 6 is a diagram for explaining the configuration of the RAM of the system of FIG. 1.

As shown in FIG. 6, the RAM 5 is broadly divided into A and B regions and the A region is subdivided into three regions of A1, A2 and A3. The data are continually stored (updated) in one of the regions A1, A2 and A3. Therefore, inhibiting data updating in S104 of the flow chart of S104 ensures that data are kept recorded in one of A1, A2 and A3.

The RAM 5 are configured as a backed-up memory and the data are retained even after the engine E is stopped. When data have been recorded in all of A1, A2 and A3, data sampling itself is terminated by a program not shown.

The data stored or recorded in the RAM 5 will be explained in detail with reference to FIG. 7. As shown, the data are broadly divided into I group and II group and are stored or recorded at addresses provided for each type of data in the A1, A2 and A3 regions.

The I group comprises data that do not vary much from the viewpoint of a short-term time series and only a single sample of these data taken at the abnormality detection time point t1 is stored or recorded. Specific examples of such data are the abnormality type discriminated at S100 (more precisely, a failure code encoded in accordance with a specified rule), the shift scheduling map in use at the abnormality detection time point t1, the distance traveled, the coolant temperature TW, etc. The discrimination of S102 is made by comparing the abnormality type recorded in any of the A1, A2 and A3 regions with abnormality type discriminated in S100 of the current program loop.

The II group comprises data whose variation is relatively large from the viewpoint of a short-term time series and data essential for controlling the transmission T. These data are stored or recorded as time series data over a prescribed time period extending back from the abnormality detection time point t1 (data recording period T1). Specifically, 15 samples written (updated) while being thinned at a prescribed (or variable) time interval are stored or recorded.

Specific examples of these data include the output signals of the sensor group, the data sampling interval (the aforesaid prescribed or variable thinning time interval (msec)), the power supply voltage and output signals to the solenoids L1–L8, and the gear ratio and slip ratio of the torque converter 12 (calculated from the engine speed NE and the input shaft rotational speed NM) computed in the CPU 3. The position signal 1 listed as a member of II group is the signal output by the shift lever position sensor 68 and the position signal 2 is the signal output by the overdrive switch or the running mode switch.

In the flow chart of FIG. 5, when the result in S102 is YES, i.e., when data on the same type of abnormality are already recorded in the RAM 5, the remaining steps of the program are skipped and the program is terminated (in other words, the data updating is continued). This is the meaning of the "case of a special condition" mentioned earlier.

Thus in this embodiment, the type of the detected abnormality is discriminated and no recording is conducted when it is found that data on the same type of abnormality as the discriminated type of abnormality are already recorded in the RAM 5. Therefore, multiple recording of similar data related to transient abnormalities and other such events that are likely to occur repeatedly can be prevented. From this it follows that important data related to a diversity of abnormalities and failures can be efficiently recorded in a prescribed recording region (the RAM 5). Viewed from another angle, it means that the capacity of the RAM 5 can be reduced and that a cost-reducing effect can be anticipated.

In the flow chart of FIG. 3, when the result in S16 is NO, the program proceeds to S20, in which it is checked whether a failure determination period T2 (e.g., 1 second; shown in FIG. 4) has passed. This is done by starting a timer (down counter) set to 1 second when start of abnormality detection is determined in S16 and checking whether the timer value has reached zero.

When the result in S20 is NO, i.e., when the failure determination period T2 has not passed, the program proceeds to S22, in which the program is terminated because failure detection is in progress. When the result is YES, i.e., when the failure determination period T2 has passed, the program proceeds to S24, in which the detected abnormality is determined or defined as a failure, and then to S26, in which information indicating that a failure was determined is recorded in the B region of the RAM 5.

Thus in this embodiment, a "failure" means a detected abnormality that persists over the failure determination period T2. In other words, a failure is an abnormality that is unlikely to disappear of its own accord and is low in repeatability, i.e., an abnormality on which transition period data critical to troubleshooting is apt to be hard to obtain even if data acquisition is continued.

Figure 8:
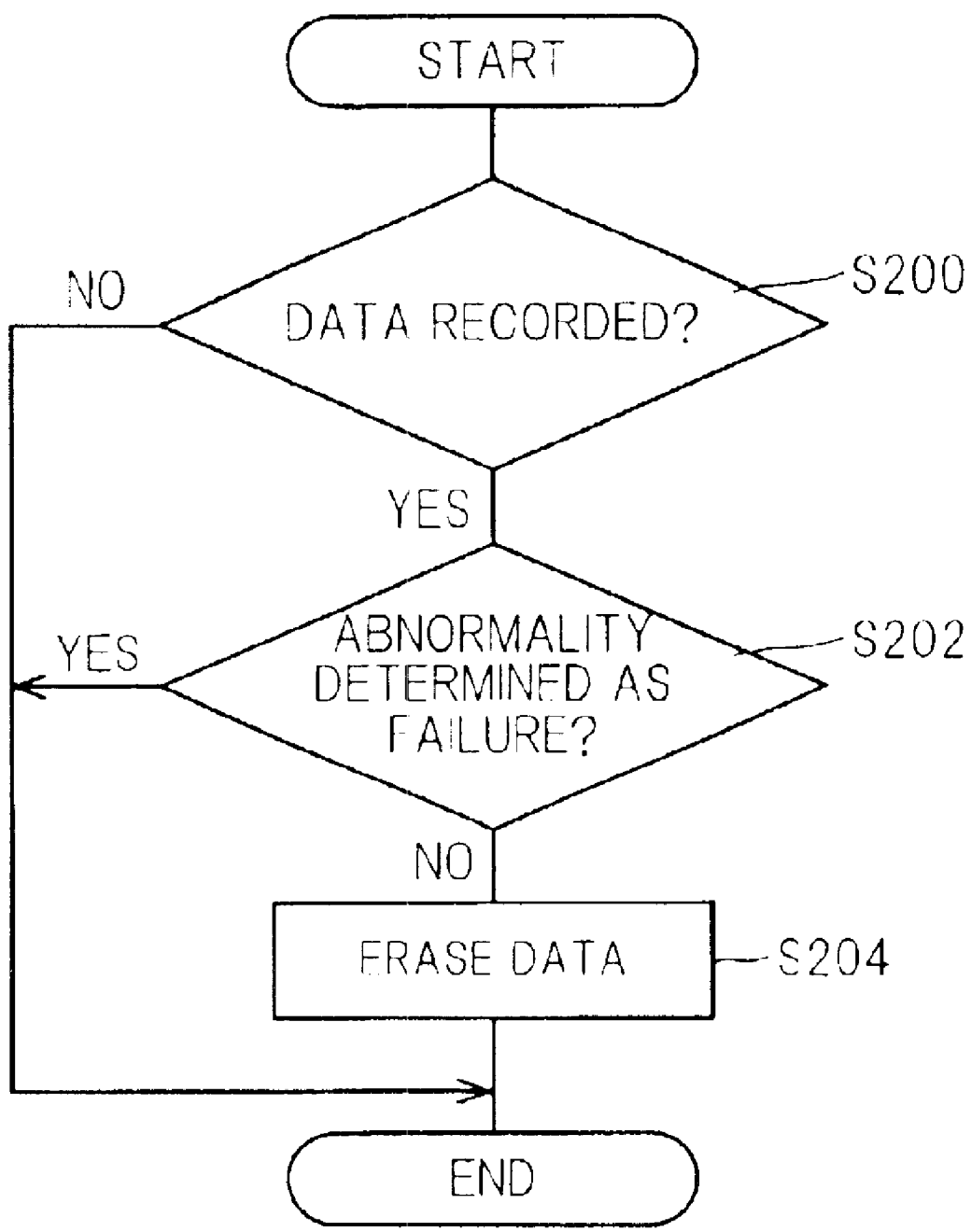
FIG. 8 is a flow chart showing a data erasure operation that is another operation of the system of FIG. 1.

Erasure of data recorded in the A region of the RAM 5, which is another operation of the data recording system 1, will now be explained with reference to FIG. 8. The program shown in FIG. 8 is executed once when the vehicle ignition switch (not shown) is turned on.

In S200, it is checked whether data are recorded in any of the A1, A2 and A3 of the A region of the RAM 5. When the result is NO, i.e., when it is found that no data are recorded, the remaining steps of the program are skipped. When the result is YES, the program proceeds to S202.

In S202, a check is made based on the failure determination information recorded in the B region of the RAM 5 as to whether an abnormality that occurred at the time the data present in the A region of the RAM 5 were recorded was defined as a failure. When the result is NO, i.e., when it is found that no abnormality corresponding to the recorded data was defined as a failure, the program proceeds to S204, in which the corresponding data recorded in one of the A region of the RAM 5 are erased. When the result is YES, i.e., when it is found that an abnormality was defined as a failure, S204 is skipped and the data retained.

Thus in this embodiment, data on transient abnormalities are periodically erased without fail and data on determined failures are retained. From this it follows that essential data (most notably transition period data) related to a diversity of failures can be efficiently recorded in the recording region. In addition, the capacity of the RAM 5 can be reduced to lower cost.

Further, at a prescribed time point, i.e., when the ignition switch is turned on, it is checked whether an abnormality has been defined as a failure and, if not, the data related to the abnormality are erased. In other words, prior to the prescribed time point, troubleshooting can be conducted also with respect to an abnormality that was not defined as a failure, because the recorded data are retained irrespective of whether or not the abnormality was defined as a failure.

Moreover, the data recorded in the RAM 5 are limited to data for a prescribed time period back from the abnormality detection time point t1 (the data recording period T1). As a result, solely data that are highly useful for troubleshooting abnormalities and failures because they were acquired during a pre-abnormality period extending up to abnormality detection and including the transition period can therefore be efficiently recorded in the recording region.

In other words, the time point of generating a trigger for effecting data recording is set not at the failure determination time point t2 (shown in FIG. 4) when the abnormality is identified as a failure but at the abnormality detection time point t1. Data acquired during the failure determination period T2 after abnormality occurrence and not very essential for abnormality and failure troubleshooting therefore need not be recorded. Since wasting of the RAM 5 recording region can therefore be prevented, the number of samples taken during the data recording period T1 can be increased and data essential for abnormality and failure troubleshooting (most notably transition period data) can be efficiently recorded.

The embodiment is thus configured to provide a system 1 for recording data (sensor outputs and calculated values, etc) indicative of operating condition of an apparatus (transmission T or sensor 56, etc), comprising; abnormality detecting means (ECU 2, S12) for detecting abnormality in the data; abnormality type discriminating means (ECU 12, S18, S100) for discriminating a type of the abnormality when the abnormality is detected; record checking means (ECU 2, S18, S102) for checking whether the data has been recorded in a prescribed recording region (the A region in the RAM 5, more specifically one of the A1, A2 and A3 regions) in association with the discriminated type of the abnormality; and data recording means (ECU 2, S18, S104) for recording the data in the prescribed recording region in association with the discriminated type of the abnormality, when the data has not been recorded in the prescribed recording region in association with the discriminated type of the abnormality.

With this, abnormality detection is conducted with respect to the data indicative of operating state of the apparatus, the abnormality type is discriminated when an abnormality is detected in the data, a check is made as to whether the data are already recorded in association with the discriminated abnormality type in a prescribed data recording region, and the data are recorded in association with the discriminated abnormality type in the prescribed data recording region when it is found that the data are not yet recorded in association with the discriminated abnormality type in the prescribed data recording region. Since, multiple recording of similar data related to transient abnormalities and other such events that are likely to occur repeatedly can be prevented, important data related to a diversity of abnormalities and failures can be efficiently recorded in the prescribed recording region. Viewed from another angle, this means that the capacity of the recording region can be reduced and that a cost-reducing effect can be anticipated.

The embodiment is also configured to provide a system 1 for recording data (sensor outputs and calculated values, etc) indicative of operating condition of an apparatus (transmission T or sensor 56, etc), comprising; abnormality detecting means (ECU 12, S12) for detecting abnormality in the data; data recording means (ECU 2, S18, S100 to S104) for recording the data in a prescribed recording region (the A region in the RAM 5, more specifically one of the A1, A2 and A3 regions) successively when the abnormality is detected; apparatus failure determining means (ECU 2, S20, S24) for determining the abnormality as a failure of the apparatus based on a prescribed condition (i.e., the abnormality continues to exist for the failure determination period T2) when the abnormality is detected; and data erasing means (ECU 2, S202 to S204) for erasing the data when it is determined at a prescribed time point (i.e., when the ignition switch is turned on) that the abnormality has not been determined as the failure of the apparatus.

With this, abnormality detection is conducted with respect to the data indicative of operating state of the apparatus, the data are successively sequentially recorded in a prescribed data recording region when an abnormality is detected in the data, the abnormality is determined or defined to be a failure of the apparatus based on a prescribed condition, a check is made at prescribed time point as to whether the abnormality was determined to be a failure, and if not, the data recorded when the abnormality not defined to be a failure was detected are erased. Important data related to a diversity of failures can therefore be efficiently recorded in the prescribed recording region. Viewed from another angle, this means that the capacity of the RAM 5 can be reduced and that a cost-reducing effect can be anticipated.

Moreover, a check is made at the prescribed time point as to whether the abnormality was determined as the apparatus failure and the data corresponding to the abnormality is erased when the abnormality was not determined as the failure. In other words, prior to the prescribed time point, troubleshooting can be conducted also with respect to an abnormality that was not defined a failure, because the recorded data are retained irrespective of whether or not the abnormality was defined a failure.

In the system data storing means (ECU 2, RAM 5) for successively storing the data at a prescribed interval; and wherein the data recording means retains the stored data for a first prescribed period of time (data recording period T1) extending back from a second time point (t1) at which the abnormality was detected.

With this, the data are sampled at a prescribed period and stored as time series data and the time series data are recorded over a prescribed time period extending back from the time point when an abnormality of the data was detected. Data important for troubleshooting abnormalities and failures, most notably transition period data, can therefore be efficiently recorded in the prescribed recording region.

in the system, the apparatus failure determining means determines the abnormality as a failure of the apparatus when the abnormality has been kept detected for a second prescribed period of time (failure determination period T2). And, the apparatus is at least one of a transmission (T) and a sensor mounted on a vehicle.

It should be noted in the above that, although the foregoing explanation of the data recording system 1 has been made taking a control system of an automatic transmission (the transmission T) as an example, it is also suitable for use in other control systems.

It should further be noted that, although the A regions of the RAM 5 is divided into three regions of A1, A2, A3 in the foregoing embodiment, it can instead be divided into two or four or more regions.

It should further be noted that, although data are kept recorded by inhibiting updating of the data stored in the RAM 5 in the foregoing embodiment, it is alternatively possible to provide a continually updatable data storage RAM (such as ring buffers) separately of the RAM 5 and record the data stored in that data storage in the RAM 5 when an abnormality is detected.

It should further be noted that, although sampled data are stored in the RAM 5 while being thinned at a prescribed time interval in the foregoing embodiment, the thinning can instead be made variable. For instance, the thinning rate can be reduced with increasing proximity to the abnormality detection time point t1 and be increased with increasing distance from the abnormality detection time point t1, so that more detailed information is recorded during the transition period.

It should further be noted that, although failure determination is done by checking whether an abnormality persists throughout the failure determination period T2 in the foregoing embodiment, it can instead be done based on the degree of the abnormality, i.e., based on the degree of disparity between the measured and normal values.

It should further be noted that, although the recorded data are retained when the abnormality is defined to be as a failure in the foregoing embodiment, the data recording system can be configured so that the data are erased by an appropriate method when the cause of the failure has been eliminated such as by repairing the apparatus concerned.

The entire disclosure of Japanese Patent Application No. 2001-243807 filed on Aug. 10, 2001, including specification, claims, drawings and summary, is incorporated herein in reference in its entirety.

While the invention has thus been shown and described with reference to specific embodiments, it should be noted that the invention is in no way limited to the details of the described arrangements but changes and modifications may be made without departing from the scope of the appended claims.

What is claimed is:

1. A system for recording data indicative of operating condition of an apparatus, comprising:

abnormality detecting means for detecting abnormality in the data;

abnormality type discriminating means for discriminating a type of the abnormality when the abnormality is detected;

record checking means for checking whether the data has been recorded in a prescribed recording region in association with the discriminated type of the abnormality;

data recording means for recording the data in the prescribed recording region in association with the discriminated type of the abnormality, when the data has not been recorded in the prescribed recording region in association with the discriminated type of the abnormality;

apparatus failure determining means for determining the abnormality as a failure of the apparatus based on a prescribed condition, when the abnormality is detected; and data erasing means for erasing the data when it is determined at a prescribed time point that the abnormality has not been determined as the failure of the apparatus.

2. A system according to claim 1, further including:

data storing means for successively storing the data at a prescribed interval;

and wherein the data recording means retains the stored data for a first prescribed period of time extending back from a second time point at which the abnormality was detected.

3. A system according to claim 1, wherein the apparatus is at least one of a transmission and a sensor mounted on a vehicle.

4. A method of recording data indicative of operating condition of an apparatus, comprising the steps of:

(a) detecting abnormality in the data;
(b) discriminating a type of the abnormality when the abnormality is detected;
(c) checking whether the data has been recorded in a prescribed recording region in association with the discriminated type of the abnormality;
(d) recording the data in the prescribed recording region in association with the discriminated type of the abnormality, when the data has not been recorded in the prescribed recording region in association with the discriminated type of the abnormality;
(e) determining the abnormality as a failure of the apparatus based on a prescribed condition, when the abnormality is detected; and
(f) erasing the data when it is determined at a prescribed time point that the abnormality has not been determined as the failure of the apparatus.

5. A method according to claim 4, further including:
a successively storing the data at a prescribed interval;
and wherein the step (d) of data recording retains the stored data for a first prescribed period of time extending back from a second time point at which the abnormality was detected.

6. A method according to claim 4, wherein the apparatus is at least one of a transmission and a sensor mounted on a vehicle.

* * * * *